US006296792B1

(12) United States Patent
Payne

(10) Patent No.: US 6,296,792 B1
(45) Date of Patent: Oct. 2, 2001

(54) MULTIAXIS ROTATIONAL MOLDING METHOD, APPARATUS AND STRUCTURE

(76) Inventor: LeRoy Payne, 3300 Nicholas La., Molt, MT (US) 59057

( * ) Notice: Subject to any disclaimer, the term of this patent is extended or adjusted under 35 U.S.C. 154(b) by 0 days.

(21) Appl. No.: 09/194,075

(22) PCT Filed: Sep. 26, 1996

(86) PCT No.: PCT/US96/15498

§ 371 Date: Oct. 31, 2000

§ 102(e) Date: Oct. 31, 2000

(87) PCT Pub. No.: WO97/16297

PCT Pub. Date: May 9, 1997

Related U.S. Application Data

(63) Continuation-in-part of application No. PCT/US95/14194, filed on Nov. 3, 1995, which is a continuation-in-part of application No. PCT/US95/06301, filed on May 18, 1995, which is a continuation-in-part of application No. 08/345,564, filed on Nov. 25, 1994, now Pat. No. 5,503,780, which is a continuation-in-part of application No. 08/249,744, filed on May 26, 1994, now Pat. No. 5,507,632, which is a continuation-in-part of application No. 07/950,135, filed on Sep. 24, 1992, now Pat. No. 5,316,701, which is a division of application No. 07/707,656, filed on May 30, 1991, now Pat. No. 5,188,845, which is a continuation-in-part of application No. 07/417,502, filed on Oct. 5, 1989, now Pat. No. 5,022,838, which is a continuation-in-part of application No. 07/271,686, filed on Nov. 16, 1988, now Pat. No. 4,956,133, which is a continuation-in-part of application No. 07/202,267, filed on Jun. 6, 1988, now Pat. No. 4,956,135, which is a continuation-in-part of application No. 06/890,742, filed on Jul. 30, 1986, now Pat. No. 4,749,533, which is a division of application No. 06/766,498, filed on Aug. 19, 1985, now Pat. No. 4,671,753.

(51) Int. Cl.$^7$ .................................................. B29C 45/33
(52) U.S. Cl. .................. 264/40.5; 264/310; 264/328.11; 425/4 R; 425/150; 425/435; 425/576
(58) Field of Search .................................. 264/40.5, 310, 264/328.11, 328.6; 425/4 R, 150, 435, 576, 574

(56) References Cited

U.S. PATENT DOCUMENTS 4,956,133 * 9/1990 Payne .................................. 425/150
4,956,135 * 9/1990 Payne .................................. 425/150

* cited by examiner

Primary Examiner—Tim Heitbrink
(74) Attorney, Agent, or Firm—Arthur L. Urban

(57) ABSTRACT

Multiaxis rotational molding apparatus (11) includes a plurality of spaced generally horizontally oriented arm members (17–20) each having one end (21) extending from an upstanding frame section (22) with one mold assembly (32–35) rotatably mounted adjacent a free end thereof. Each mold assembly includes a plurality of separable mold sections (36) including plate sections (38). A plurality of movable elongated mixing chambers (47–49), each including a plurality of adjacent axially aligned rotatable driven mixing sections (52–54). A control portion (15) includes an indexing mechanism (67, 68) sequentially orienting a dispenser of each mixing chamber with each mold assembly to control formation of molded structures continuously in a preselected multiaxis molding profile. Also, a method of forming molded structures with the molding apparatus is disclosed.

20 Claims, 1 Drawing Sheet

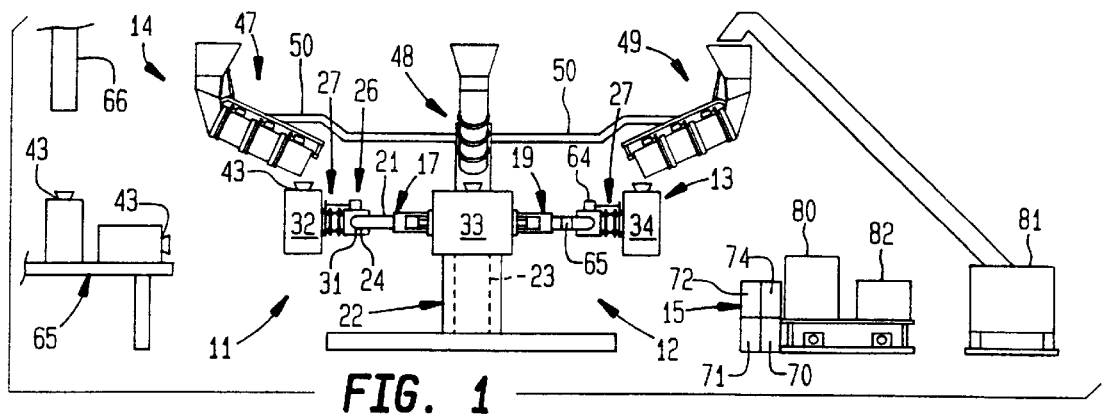
FIG. 1
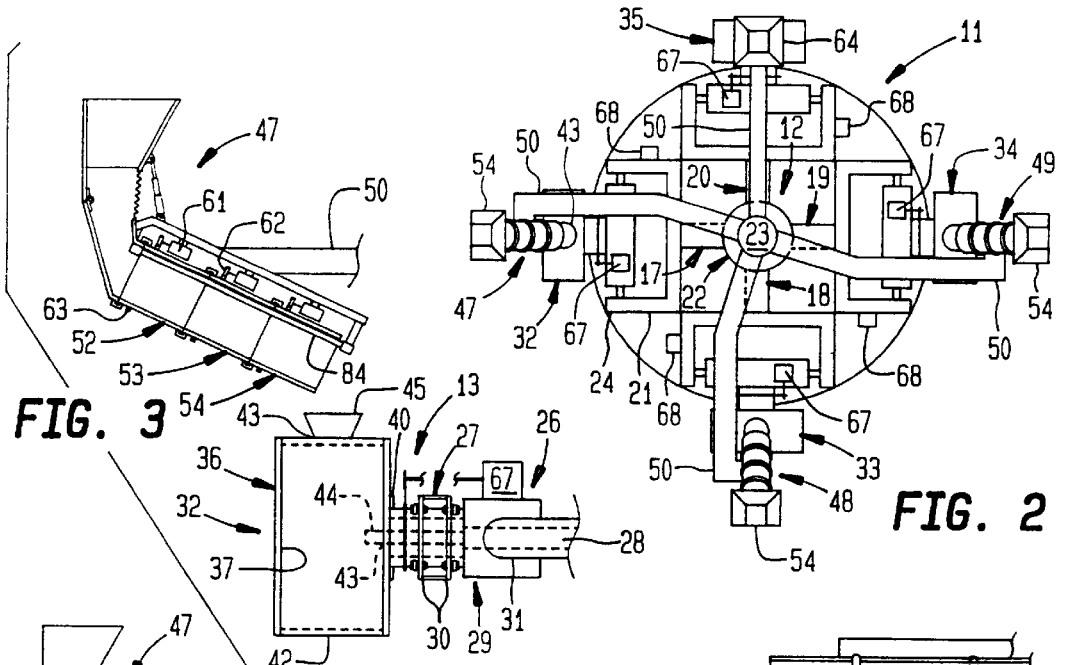
FIG. 3
FIG. 2
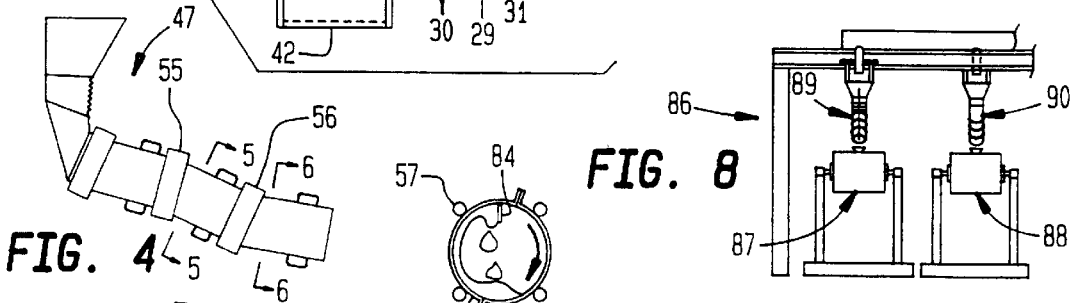
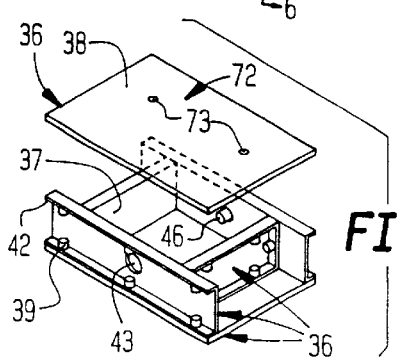
FIG. 4
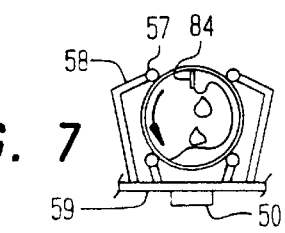
FIG. 5
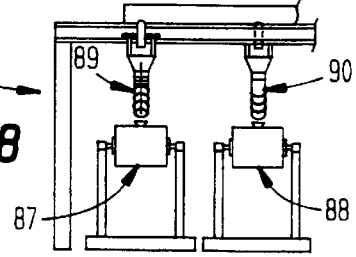
FIG. 8
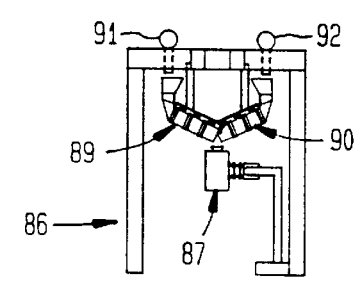
FIG. 7
FIG. 6
FIG. 9

MULTIAXIS ROTATIONAL MOLDING METHOD, APPARATUS AND STRUCTURE

This application, is a continuation-in-part of pending International application No. PCT/US95/14194, filed Nov. 3, 1995, which in turn is a continuation-in-part of pending application No. PCT/US95/06301, filed May 18, 1995, which in turn is a continuation-in-part of application Ser. No. 08/345,564, filed Nov. 25, 1994, now U.S. Pat. No. 5,503,780, which in turn is a continuation-in-part of application Ser. No. 08/249,744, filed May 26, 1994, now U.S. Pat. No. 5,507,632, which in turn is a continuation-in-part of application Ser. No. 07/950,135, filed Sep. 24, 1992, now U.S. Pat. No. 5,316,701, which in turn is a division of application Ser. No. 07/707,656, filed May 30, 1991, now U.S. Pat. No. 5,188,845, which in turn is a continuation-in-part of application Ser. No. 07/417,502, filed Oct. 5, 1989, now U.S. Pat. No. 5,022,838, which in turn is a continuation in-part of application Ser. No. 07/271,686, filed Nov. 16, 1988, now U.S. Pat. No. 4,956,133, which in turn is a continuation-in-part of application Ser. No. 07/202,267, filed Jun. 6, 1988, now U.S. Pat. No. 4,956,135, which in turn is a continuation-in-part of application Ser. No. 06/890,742, filed Jul. 30, 1986, now U.S. Pat. No. 4,749,533, which in turn is a division of application Ser. No 06/766,498, filed Aug. 19, 1985, now U.S. Pat. No. 4,671,753.

This invention relates to a novel molding method, apparatus and structure produced thereby and more particularly relates to a new multiaxis rotational molding method, apparatus and the resulting structure.

The present invention provides a novel molding method and apparatus which not only overcome the deficiencies of present technology but also provide features and advantages not found in earlier expedients. The multiaxis rotational molding method and apparatus of the invention provide a means for the production of a large number of uniform high quality structures rapidly and efficiently.

The multiaxis rotational molding apparatus of the present invention is simple in design and can be produced relatively inexpensively. Commercially available materials, components and conventional metal fabricating procedures can be employed by semi-skilled labor in the manufacture of the apparatus. The apparatus is durable in construction and has a long useful life with a minimum of maintenance.

The apparatus of the invention can be operated by individuals with limited mechanical skills and experience. A large number of high quality molded structures can be produced rapidly by such persons safely and efficiently with a minimum of supervision.

The molding method and apparatus of the invention can be modified to mold a wide variety of new structures. Variations both in product configuration and composition can be attained simply and conveniently with the method and apparatus of the invention. Even with such variations, uniformity and quality of product dimensions and shapes still are maintained without difficulty.

A novel method of the present invention for continuously forming integrally molded structures includes the steps of forming a plurality of polymerizable mixtures by mixing liquid reactive resin forming material and particulate solid additive material substantially continuously while tumbling the materials along a generally cylindrical path in a preselected orientation. The direction of the tumbling is reversed as the materials advance along the cylindrical path. Substantially all of the additive particles are encapsulated with the resin forming material in a preselected thickness.

The method of the invention includes rotating a plurality of multisection mold assemblies about a plurality of axes. A freshly formed supply of a first polymerizable mixture is indexed into alignment with a first mold assembly. The first polymerizable mixture is flowed over surfaces of a first enclosed mold cavity within the first mold assembly. The flowing of the first mixture over the first mold cavity surfaces and formation of a first resin therefrom are monitored.

The supply of the first polymerizable mixture then is indexed into alignment with an adjacent second mold assembly. The first polymerizable mixture is flowed over surfaces of a second enclosed mold cavity within the second mold assembly. Simultaneously therewith, a freshly formed supply of a second polymerizable mixture is indexed into alignment with the first mold assembly. The second polymerizable mixture is flowed over the first resin within the second mold cavity. The flowing of the first and second mixtures within the first and second mold cavities and formation of first and second resins therefrom are monitored.

The supply of the first polymerizable mixture next is indexed into alignment with an adjacent third mold assembly. The first polymerizable mixture is flowed over surfaces of a third enclosed mold cavity within the third mold assembly. Simultaneously therewith, the supply of the second polymerizable mixture is indexed into alignment with the second mold assembly. The second polymerizable mixture is flowed over the first resin within the second mold cavity. The flowing of the first and second mixtures within the second and third mold cavities and formation of first and second resins therefrom are monitored.

The indexing of the supplies of other polymerizable mixtures into alignment with the mold assemblies and the flowing of the mixtures into the respective mold cavities is continued until all of the mold assemblies have received the all of the mixtures. Also, the flowing of these mixtures and the formation of resins therefrom are monitored.

The rotation of the mold assemblies is continued throughout the steps of the continuous molding operation while monitoring individually each axis rotation of the mold assemblies. The monitored flowing of each mixture and the monitored formation of each resin are coordinated with each monitored axis rotation in a preselected profile to form the integrally molded structures of the resins.

The mold sections of each mold assembly are separated after the integrally molded structure therein has achieved structural integrity within the mold cavity. The structure is removed from the separated mold sections and the steps are repeated to form a multiplicity of the molded structures on a continuing basis.

If desired, solid particles may be introduced into the mold cavity of a mold assembly and the particles distributed in a preselected configuration before indexing the supply of a polymerizable mixture into alignment with the respective mold assembly. Also, the flowing of at least one of the polymerizable mixtures into a mold cavity may be accomplished through a delivery conduit while it is being withdrawn through the mold cavity.

Preferably, each mold assembly is transferred to an adjacent mold receiving station prior to separating the mold sections, removing the molded structure and returning the mold assembly to a molding position for repeating the method of the invention. A plurality of mold assemblies may be provided for each molding position so molding can continue while other mold assemblies are being opened and being prepared for another molding cycle. Cavity changing inserts may be positioned into the mold cavity while the mold sections are separated.

Benefits and advantages of the novel multiaxis rotatable molding method and apparatus of the present invention will be apparent from the following description and the accompanying drawings in which:

BRIEF DESCRIPTION OF DRAWINGS

FIG. 1 is a side view of one form of multiaxis rotational molding apparatus of the invention;

FIG. 2 is a fragmentary top view of the molding apparatus shown in FIG. 1;

FIG. 3 is an enlarged fragmentary side view of the mixing and molding portions of the molding apparatus shown in FIG. 1;

FIG. 4 is a schematic side illustration of another form of a mixing portion of the molding apparatus shown in FIGS. 1–3;

FIGS. 5 and 6 are sectional views taken along lines 5—5 and 6—6 respectively of FIG. 4;

FIG. 7 is a view in perspective of a mold assembly shown in FIG. 1;

FIG. 8 is a fragmentary side view of another form of multiaxis rotational molding apparatus of the present invention; and FIG. 9 is a left end view of the molding apparatus shown in FIG. 8.

As shown in FIGS. 1–3 of the drawings, one form of multiaxis rotational molding apparatus 11 of the present invention includes a support portion 12, a molding portion 13, a mixing portion 14 and a control portion 15.

The support portion 12 of the multiaxis rotational molding apparatus 11 of the invention includes a plurality of arm members 17,18,19,20 disposed in a generally horizontal orientation. One end 21 of each arm member 17–20 extends from an upstanding frame section 22. Advantageously, the upstanding frame section 22 includes a central upstanding section 23 from which the arm members extend radially as shown in the drawings.

The molding portion 13 of the rotational molding apparatus 11 includes a plurality of mold supporting assemblies 26. One mold supporting assembly is rotatably mounted adjacent a free end 24 of each arm member 17–20. Each mold supporting assembly 26 includes an independently rotatable mold connector section 27. Each mold supporting assembly also includes a central passage 28 therethrough. The central passage extends from a rotatable connection 29 with the respective arm member and through the mold connector section 27.

The mold connector section 27 preferably includes spaced support sections 30 disposed along central passage 28 therethrough. Each arm member 17–20 advantageously also may includes one or more pivotal connections 31 along its length.

The molding portion 13 further includes a plurality of mold assemblies 32,33,34,35. Each mold assembly includes a plurality of separable mold sections 36 forming a substantially enclosed mold cavity 37.

As shown in FIG. 7, mold sections 36 may include plate sections 38. The plate sections may be substantially flat or may be of another configuration such as corresponding to that of a product being molded. The plate sections may include cavity surfaces with wear resistance, lubricity and/or other special properties with or without underlying foam as may be formed with the method of the invention.

Connecting means e.g. electromagnets 39, selectively secure the mold sections together. Also, connecting means 40 secure the assembled mold sections to mold connector section 27. Advantageously, mold sections 36 include flanges 42 overlapping adjacent sections. Sections 36 may include an opening 43 therethrough which may be disposed concentrically with a delivery conduit 44 (FIG. 3) during the molding operation. The delivery conduit preferably is capable of being withdrawn from the mold cavity 37 at a preselected rate.

A short tubular member advantageously may be affixed within an opening 43. The tubular member may function as a funnel 45 (FIG. 3) to facilitate introduction of material into the mold cavity. Also, a tubular member may interconnect with a similar tube 46 (FIG. 7) in an adjacent structural unit to provide communication between cavities of assembled structures.

The mixing portion 14 of the multiaxis rotational molding apparatus 11 of the present invention includes a plurality of elongated mixing chambers 47,48,49. The mixing chambers are adjustably mounted in a generally inclined orientation on horizontal beams 50 extending from frame section 22. The mixing chambers and the mold assemblies are mounted for relative movement therebetween.

Each mixing chamber 47–49 includes a plurality of adjacent axially aligned rotatable mixing sections 52, 53, 54. Advantageously, the orientation of each mixing section is adjustable with respect to that of adjacent mixing sections as shown in FIG. 4.

Although the internal surfaces of the mixing sections usually are smooth, it may be desirable to utilize roughened surfaces, inwardly extending protrusions, e.g. blades, vanes, and the like. With such constructions, it is preferred that means be provided to clean the surfaces periodically. For example, blades or vanes can be retractable to remove any materials adhering thereto. Also, the mixing sections may be constructed of separable housings 51.

The sections 52–54 are operatively connected with slip members 55, 56. The sections of each mixing chamber are supported on spaced rollers 57 mounted on the ends of arm members 58 which extend upwardly from a base section 59. Base section 59 in turn is adjustablly disposed on horizontal beam 50.

The mixing portion 14 includes independent drive means for each mixing section 52–54. As shown in the drawings, each drive means includes a motor 61 with a sprocket 62 engaging a ring gear 63 either directly or through a chain.

Advantageously, the mixing portion also may include a solid particle feeding hopper 64 which is operable independently of the mixing chambers 47–49. As shown in the drawings, the molding apparatus 11 preferably includes mold assembly receiving stations 65 adjacent each arm member 17–20.

The control portion 15 of the molding apparatus 11 of the present invention includes actuating means including drive means 67,68 for each mold assembly. One drive means 67 rotates each mold supporting assembly 26 and the mold assembly 32–35 affixed thereto. Another drive means 68 rotates each mold supporting assembly 26 and the mold assembly affixed thereto along an axis generally perpendicular to the axis of rotation achieved with drive means 67. Other drive means may be provided for opening, closing, transferring mold assemblies, driving mixing elements, etc. as required.

The control portion 15 also includes programmable memory means 70, coordinating means 71, monitoring means 72 and circuitry therefor. The drive means 67,68 advantageously include gear motors, chains and sprockets connected thereto. Preferably, the gear motors are variable speed motors. The actuating means may activate other components such as pumps, valves, drives, electromagnets, etc. Preferably, the monitoring means 72 includes optical fibers 73 extending through the mold sections 36 as shown in FIG. 7.

The coordinating means 71 advantageously includes a process controller 74 that initiates changes in the flows of materials and speeds of drives for each mold assembly to bring variations therein back to the respective rates specified in the programs present in the memory 70. This coordination commonly is achieved through the transmission of information such as digital pulses from the monitors and/or sensors at the control components to the process controller 74.

The operating information is compared with the preselected programming parameters stored in the memory 70. If differences are detected, instructions from the controller change the operation of the components to restore the various operations to the preselected processing specifications.

In the use of the multiaxis rotational molding apparatus 11 of the present invention, the designs of the structures desired first are established. Then, each design is programmed into the memory 70.

To start the operation of the apparatus 11, buttons and/or switches of a control panel (not shown) are depressed to activate the memory 70 and the other components of the control portion 15. The coordinating means 71 energizes drive means 67,68.

Also, monitors 72 and pumps, valves, etc. (not shown) are energized by the coordinating means 71 in the preselected sequences of the program stored in the memory 70. This causes the raw materials in reservoirs 80,81,82 to advance along inlet conduits (not shown) toward the respective mixing chambers 47–49 located above each of the mold assemblies 32–35 of the molding apparatus 11. For example, to mold a structure including a polyurethane resin, reservoir 80 may contain a liquid reactive resin forming material, reservoir 81 a particulate solid recyclable material and reservoir 82 and other reservoirs colors, catalysts, etc. as required.

To produce high quality molded structures of the invention, it is important that the raw material delivered to each mixing chamber be uniform in volume and composition. This can be facilitated by providing a continuous flow of raw materials to each mixing chamber and the immediate transfer of each mixture therefrom onto the cavity surface of a mold assembly 32–35. Advantageously, a separate bypass conduit (not shown) is utilized from the end of each inlet conduit at a point adjacent a particular mixing chamber back to the respective reservoir. The control portion 15 coordinates the operation of the various system components so the preselected quantities of the required materials are delivered to each mixing chamber.

The liquid reactive resin forming material and the particulate solid additive material enter into the rotating upper mixing section 52 simultaneously. The additive particles and the liquid resin formers are mixed as they advance from section 52 to section 53 and into section 54.

The mixing of the materials can be influenced by changing the operating parameters in each section. For example, the speed of rotation and/or the inclination of a particular section can be changed and even the direction of rotation can be reversed.

FIGS. 5 and 6 illustrate the position of the materials at different points along the mixing chamber. FIG. 5 shows the materials in a section being rotated in a clockwise direction and FIG. 6 rotation in a counterclockwise rotation. In the rotation of each section, as the materials reach stationary wiper blade 84, the materials are separated from the inner surface of the section and tumble to the bottom of the section. The partially mixed materials again adhere to the surface and travel upward into contact with the blade, are separated therefrom and tumble to the bottom of the section.

Each freshly formed polymerizable mixture is delivered from a particular mixing chamber 47–49 into a preselected cavity 37 of a rotating mold assembly 32–35. Each mold assembly is rotated about an axis concentric with that of mold connector section 27 and about a second axis perpendicular to its concentric axis. The multiple axis rotational movement and any arcuate movement are continued to complete the flow of the mixture over all areas being covered within a particular mold cavity. All movements are controlled within the parameters stored in the memory 70.

For particular structures, the movements about the respective axes may be continuous and/or intermittent at changing rates. Also, it may be desirable to provide arcuate rotation, that is, movement about an arc such as a rocking motion.

Monitors 72 located within each mold assembly 32–35 signal the process controller 74 when each polymerizable mixture has been distributed over the preselected areas of the respective mold cavity so the controller can initiate the next step of the molding method.

For example, with the control components of the molding apparatus 11 activated, a first mixing chamber 47 is indexed into alignment with the first mold assembly 32. A first freshly formed polymerizable mixture flows from the mixing chamber into mold cavity 37 and flows over the cavity surface and a first resin layer is formed therein. The flowing of the first mixture over the cavity surfaces and formation of a first resin therefrom are monitored.

Thereafter, the first mixing chamber 47 is indexed into alignment with an adjacent second mold assembly 35 and the first polymerizable mixture flowed into the mold cavity thereof. Simultaneously therewith, a second mixing chamber 48 is indexed into alignment with the first mold assembly 32 and a second polymerizable mixture is delivered into the mold cavity of the first mold assembly 32 flowing over the first resin formed in the cavity. The flowing of the first and second mixtures within the first and second mold cavities and formation of a first and second resin therefrom are monitored.

Next, the first mixing chamber 47 is indexed into alignment with a third mold cavity of an adjacent third mold assembly 34 and the first mixture flowed over the cavity surfaces. Simultaneously therewith, the second mixing chamber 48 is indexed into alignment with the second mold cavity of the second mold assembly 35 and the second mixture flowed over the first resin formed therein. The flowing of the first and second resins and formation of a first and second resin therefrom are monitored.

The indexing of the first and second mixing chambers 47,48 as well as mixing chamber 49 and solid particle hopper 64 into alignment with each mold assembly and the flowing of each mixture into each mold cavity of any additional mold assemblies is continued until all of the mold assemblies have received the mixtures according to the preselected molding parameters. The monitoring of the mixture flow, resin formation and mold assembly rotation is continued throughout the molding operation as well as the coordinating of this operating information with the preselected program profile.

When a molded structure within a mold cavity is sufficiently cured that it possesses structural integrity, rotation of the respective mold assembly is stopped and the mold assembly is transferred to an adjacent mold receiving station 65 with hoist means 66. The mold sections 36 are separated to free the structural unit.

The molded structure then may be set aside to complete the curing of the resin therein. During this period, the molded structure, free of the mold's restraint, stresses the high density outer skin or layer. This stressing of the skin increases the strength and puncture resistance thereof and also the structural strength of the unit itself.

The mold sections 36 are prepared for another molding cycle. This may include changing the position of one or more mold sections with respect to each other, the substitution of mold sections with different configurations and the like. Also, cavity changing inserts (not shown) may be positioned against the plate sections, if desired.

The mold sections 36 then are assembled together and secured such as by energizing electromagnets 39. The mold assembly now is ready for repositioning on the adjacent arm member when the next mold assembly is removed therefrom.

FIGS. 8 and 9 illustrate schematically another form of rotational molding apparatus 86 of the present invention. The apparatus provides for the arrangement of a plurality of molding assemblies 87,88 in a straight line with mixing chambers 89,90 traveling from one mold assembly to the next along overhead tracks 91,92. In other respects, the apparatus may include components similar to those of apparatus 11 as described above.

The polymerizable mixtures employed to produce the structures of the invention are selected to be capable of reaction to form the particular resin desired in the final structure. Advantageously, the resin is a thermosetting resin such as a polyurethane or polyester. Should a polyurethane be desired, one reservoir 80–82 may contain an isocyanate and another reservoir may contain a polyol. More commonly, the reservoirs may contain different partially formed materials which upon mixing interact to form the desired polyurethane. Examples of such partially formed materials include so-called "A stage" resins and "B stage" resins.

Other resin forming systems may utilize a resin forming material in one reservoir and a catalyst in a second reservoir. Additional components can be pre-mixed with one of the resin formers, e.g. fillers, reinforcements, colors and the like.

The particulate solid additive material may be any of a wide variety of materials which impart special properties to the final structure such as wear resistance, lubricity, electrical, magnetic, temperature conductivity or isolation, and the like. Some inexpensive particulate materials generally are readily available at a particular job site. Natural mineral particulate material such as sand and gravel normally are present or can be produced simply by crushing rock at the site.

Waste or recycled materials which can be shredded or ground into particles of suitable size can be utilized. Particularly useful are particles formed by shredding or grinding discarded tires and similar products. Since the particles are encapsulated with the resin forming material and not saturated therewith, many different waste materials may be employed.

The above description and the accompanying drawings show that the present invention provides a novel multiaxis rotational molding method and apparatus which not only overcome the deficiencies and shortcomings of earlier expedients, but in addition provide novel features and advantages not found previously. The method and apparatus of the invention provide simple inexpensive means for producing uniform high quality products efficiently and at high rates of production.

The apparatus of the invention is efficient in its design and operation and is relatively inexpensive. Commercially available materials and components can be utilized in the fabrication of the apparatus using conventional metal working techniques and procedures.

Structures can be produced automatically with the apparatus of the invention by operators with limited experience and aptitude after a short period of instruction. The apparatus is durable in construction and has a long useful life with a minimum of maintenance.

The method and apparatus of the invention can be utilized to mold a wide variety of new and different structures. Variations in configuration and composition of the products can be achieved simply and quickly with the method and apparatus of the invention.

It will be apparent that various modifications can be made in the multiaxis rotational molding method and apparatus and structures formed therewith described in detail above and shown in the drawings within the scope of the present invention. The size, configuration and arrangement of components can be changed to meet specific requirements. For example, the mold assemblies and mixing chambers may be arranged differently with respect to one another. In addition, the number and sequence of processing steps may be different. Also, the structures may include other components and ingredients as desired.

These and other changes can be made in the method, apparatus and structure described provided the functioning and operation thereof are not adversely affected. Therefore, the scope of the present invention is to be limited only by the following claims.

What is claimed is:

1. Multiaxis rotational molding apparatus including a support portion, a molding portion, a mixing portion and a control portion; said support portion including an upstanding frame section, a plurality of spaced generally horizontally oriented arm members each having one end extending from said upstanding frame section; said molding portion including a plurality of mold supporting assemblies with one supporting assembly rotatably mounted adjacent a free end of each of said arm members, each of said mold supporting assemblies including an independently rotatable mold connector section, each of said mold supporting assemblies including a central passage therethrough from a rotatable connection with said arm member and through said mold connector section, a plurality of mold assemblies each including a plurality of separable mold sections forming a substantially enclosed cavity, connecting means selectively securing said mold sections of one mold assembly together and to said mold connector section; said mixing portion including a plurality of independently movable elongated mixing chambers adjustably mounted on said frame section adjacent said mold assemblies, each of said mixing chambers including a plurality of adjacent axially aligned rotatable mixing sections, independent drive means rotating each of said mixing sections about a central axis; said control portion including indexing means disposed on said frame section sequentially orienting each of said mixing chambers with each mold cavity, actuating means rotating each mold connector section and said mold assembly affixed thereto and actuating means pivoting each mold supporting assembly and said mold assembly affixed thereto with respect to said arm member, programmable memory means storing preselected operating parameters, monitoring means sensing operating information from control components, circuitry transmitting signals from said monitoring means to coordinating means comparing said operating information with said operating parameters stored in said memory means and activating said indexing means and said actuating means to control formation of molded structures with said molding apparatus continuously in a preselected multiaxis molding profile.

2. Multiaxis rotational molding apparatus according to claim 1 including positioning means adjusting the orientation of each mixing section with respect to adjacent mixing sections.

3. Multiaxis rotational molding apparatus according to claim 1 wherein said mixing sections are operatively connected with slip members.

4. Multiaxis rotational molding apparatus according to claim 2 wherein said positioning means includes sensing means and actuating means.

5. Multiaxis rotational molding apparatus according to claim 1 wherein said mixing sections include separable housings.

6. Multiaxis rotational molding apparatus according to claim 1 including drive means providing relative movement between said mixing chambers and said mold assemblies.

7. Multiaxis rotational molding apparatus according to claim 1 wherein said control portion includes actuating means separating and assembling said mold sections.

8. Multiaxis rotational molding apparatus according to claim 1 including a mold assembly receiving station adjacent said free end of each of said arm members.

9. Multiaxis rotational molding apparatus according to claim 8 including means for transferring a mold assembly between said arm member and said adjacent mold receiving station.

10. Multiaxis rotational molding apparatus according to claim 1 including dispensing means which includes a delivery conduit extendable into said mold cavity through said central passage of said mold supporting assembly.

11. Multiaxis rotational molding apparatus according to claim 10 including withdrawal means capable of withdrawing said delivery conduit from said mold cavity at a preselected rate.

12. Multiaxis rotational molding apparatus according to claim 1 wherein said plate sections include an opening therethrough.

13. Multiaxis rotational molding apparatus according to claim 1 wherein said rotatable mold connector section includes spaced support sections disposed along said central passage therethrough.

14. A method of continuously forming integrally molded structures in a multiaxis rotational molding operation including the steps of forming a plurality of preselected polymerizable mixtures including mixing liquid reactive resin forming material and particulate solid additive material substantially continuously while tumbling said materials along a generally cylindrical path in a preselected orientation and reversing the direction of said tumbling as said materials advance along said cylindrical path; rotating a plurality of multisection mold assemblies about a plurality of axes, indexing a freshly formed supply of a first polymerizable mixture into alignment with a first mold assembly, flowing said first polymerizable mixture over surfaces of a first enclosed mold cavity within said first mold assembly, monitoring said flowing of said first mixture over said first mold cavity surfaces and formation of a first resin therefrom, indexing said supply of said first polymerizable mixture into alignment with an adjacent second mold assembly, flowing said first polymerizable mixture over surfaces of a second enclosed mold cavity within said second mold assembly, simultaneously therewith indexing a freshly formed supply of a second polymerizable mixture into alignment with said first mold assembly, flowing said second polymerizable mixture over said first resin within said first mold cavity, monitoring said flowing of said first and second mixtures within said first and second mold cavities and formation of a first and second resin therefrom, indexing said supply of said first polymerizable mixture into alignment with an adjacent third mold assembly, flowing said first polymerizable mixture over surfaces of a third enclosed mold cavity within said third mold assembly, simultaneously therewith indexing said supply of said second polymerizable mixture into alignment with said second mold assembly, flowing said second polymerizable mixture over said first resin within said second mold cavity, monitoring said flowing of said first and second polymerizable mixtures within said second and third mold cavities and formation of first and second resins therefrom, continuing said indexing of said supplies of other of said polymerizable mixtures into alignment with said mold assemblies and the flowing of said mixtures into the respective mold cavities until all of the mold assemblies have received all of said mixtures, monitoring said flowing of said mixtures and formation of resins therefrom, continuing said rotation of said mold assemblies throughout said steps of said continuous molding operation while monitoring individually each axis rotation of said mold assemblies, and coordinating said monitored flowing of each mixture and said monitored formation of each resin with each monitored axis rotation in a preselected profile to form said integrally molded structures of said resins, separating said mold sections of each mold assembly after each integrally molded structure therein has achieved structural integrity within said mold cavity, removing said integrally molded structure from said separated mold sections and repeating said steps to form a multiplicity of said integrally molded structures on a continuing basis.

15. A method of continuously forming integrally molded structures according to the method of claim 14 including the step of changing orientation along preselected sections of said cylindircal path during formation of said polymerizable mixtures.

16. A method of continuously forming integrally molded structures according to the method of claim 14 including the step of adding materials along preselected sections of said cylindrical path during formation of said polymerizable mixtures.

17. A method of continuously forming integrally molded structures according to the method of claim 14 including the steps of transferring each mold assembly to an adjacent mold receiving station prior to separating said mold sections and removing said structure from said separated mold sections and thereafter returning said mold assembly to a molding position for repeating the above steps.

18. A method of continuously forming integrally molded structures according to the method of claim 14 including the step of changing the position of said mold sections with respect to each other prior to reassembling said mold sections and repeating the above steps.

19. A method of continuously forming integrally molded structures according to the method of claim 14 including the steps of introducing solid particles into a mold cavity and distributing said particles into a preselected configuration before indexing said supplies of said polymerizable mixtures into alignment with said mold assemblies.

20. A method of continuously forming integrally molded structures according to the method of claim 14 including the step of flowing at least one of said polymerizable mixtures into a mold cavity while a delivery conduit is being withdrawn through said mold cavity.

* * * * *